United States Patent [19]

Taylor

[11] Patent Number: 4,981,392

[45] Date of Patent: Jan. 1, 1991

[54] WATER INFLATABLE STRUCTURAL MODULE

[76] Inventor: Geoffrey L. Taylor, 211 Oak Street, Winnipeg, Manitoba, Canada, R3M 3P7

[21] Appl. No.: 372,840

[22] Filed: Jun. 29, 1989

[51] Int. Cl.$^5$ .............................................. E02B 7/20
[52] U.S. Cl. ................................... 405/115; 405/15; 405/91; 405/116; 405/21; 383/3; 383/108
[58] Field of Search ................................... 405/17–19, 405/115, 116, 90–91, 15, 21, 29; 138/93, 109; 383/3, 62, 108, 904, 905

[56] References Cited

U.S. PATENT DOCUMENTS

| | | | |
|---|---|---|---|
| 1,581,072 | 4/1926 | Lumsden | 383/100 X |
| 1,762,893 | 6/1930 | Saul | 383/904 X |
| 1,927,725 | 9/1933 | Tompkins | 383/3 X |
| 2,609,666 | 9/1952 | Mesnager | 405/115 |
| 3,213,628 | 10/1965 | Serota | 405/111 |
| 3,834,167 | 9/1974 | Tabor | 405/115 |
| 4,184,788 | 1/1980 | Colle | 405/19 |
| 4,610,284 | 9/1986 | Bartholomew | 285/901 X |
| 4,692,060 | 9/1987 | Jackson, III | 405/115 |
| 4,772,278 | 9/1988 | Baber | 383/100 X |

FOREIGN PATENT DOCUMENTS

| | | | |
|---|---|---|---|
| 148767 | 5/1921 | United Kingdom | 405/116 |
| 2157552 | 10/1985 | United Kingdom | 383/3 |

*Primary Examiner*—Dennis L. Taylor
*Assistant Examiner*—Franco S. DeLiGuori
*Attorney, Agent, or Firm*—William L. Chapin

[57] ABSTRACT

A water inflatable structural module for constructing temporary dikes and related structures includes two identical elongated flattened cylinders sealed at opposite lateral ends to form a sealed, water-tight chamber within a cylinder. The cylinders are joined along a horizontal mid-plane to opposite longitudinal edges of a thin, flexible, elongated, rectangular web. A sealable inlet port in each of the two cylinders permits the cylinders to be inflated with water to form two relatively stiff, parallel, elongated cylinders attached at facing inner mid section lines to the flexible web. In a preferred version of the module the width of the web, and therefore the minimum spacing between the two cylinders with the web flat, is of the proper dimension to make the ratio of minimum spacing to inflated cylinder diameter lie in the approximate range of 1.75 to 1 to 2 to 1. That ratio allows tubes from a second and third module to lie side by side on the web of a first module, in tangential contact with the tubes of the first module. Thus constructed, any desired number of modules may be stacked to form an interlocking structure of any desired height, length and width without the use of any fastening elements, which resists lateral movement of modules with respect to one another, in a direction perpendicular to the longitudinal axes of the modules. The structural module is of elongated, substantially uniform transverse cross-sectional shape permitting fabrication of the module by a low cost extrusion process.

18 Claims, 3 Drawing Sheets

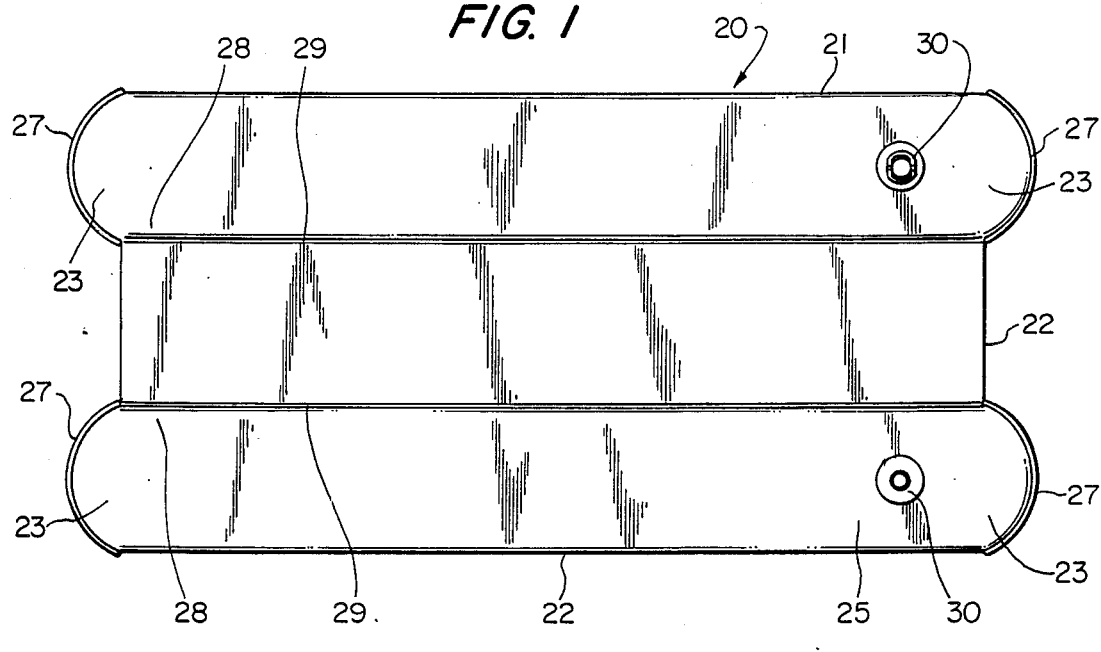
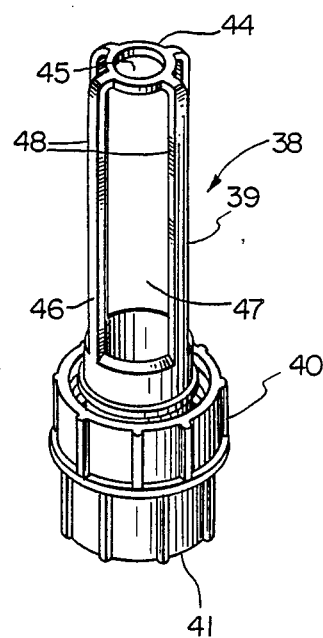
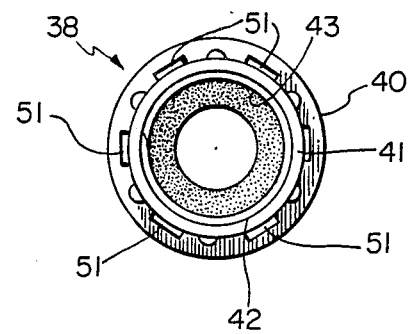
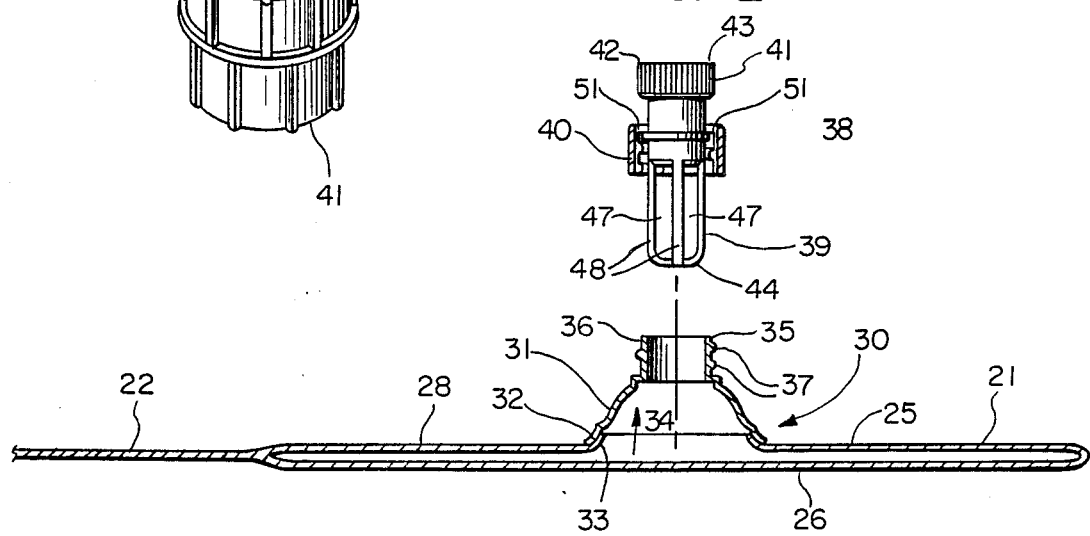

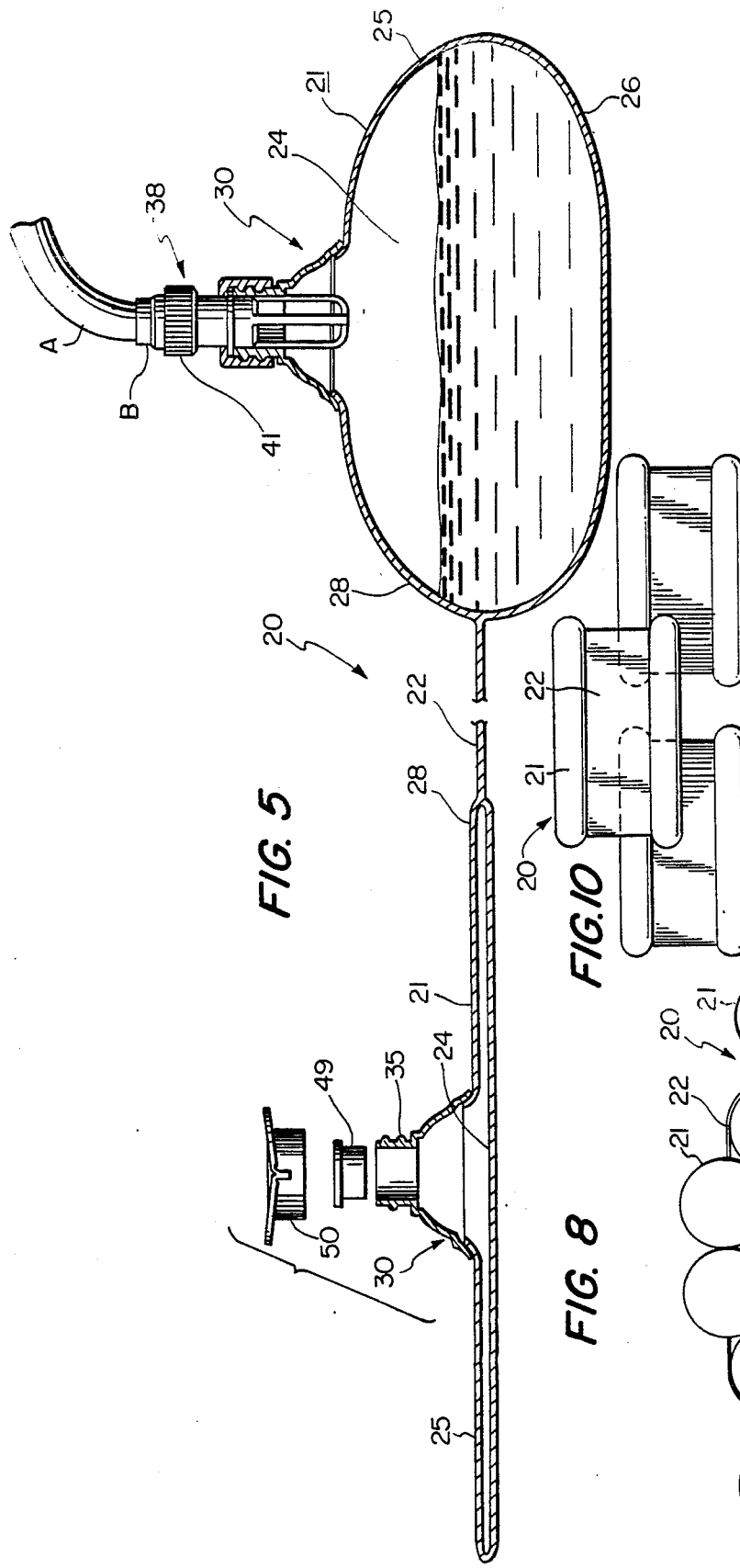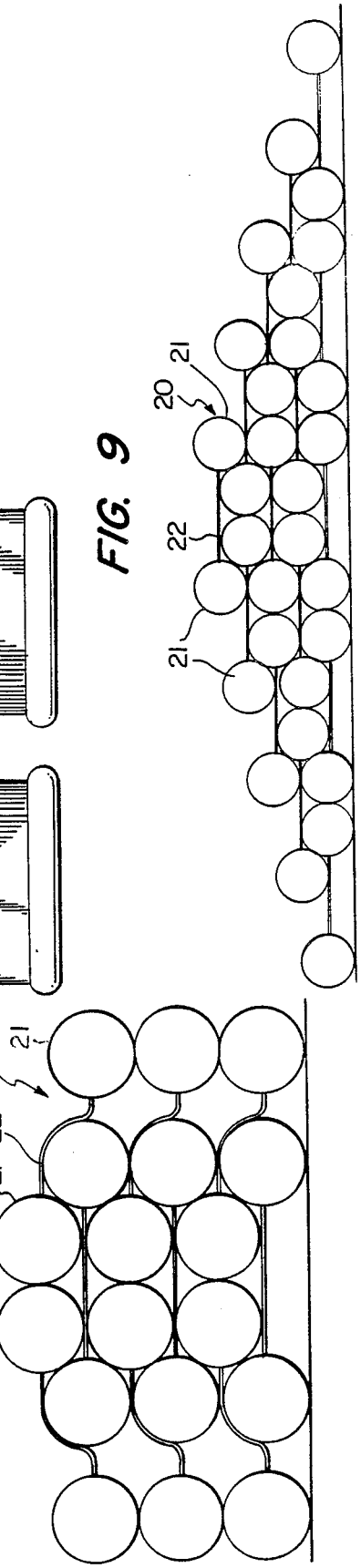

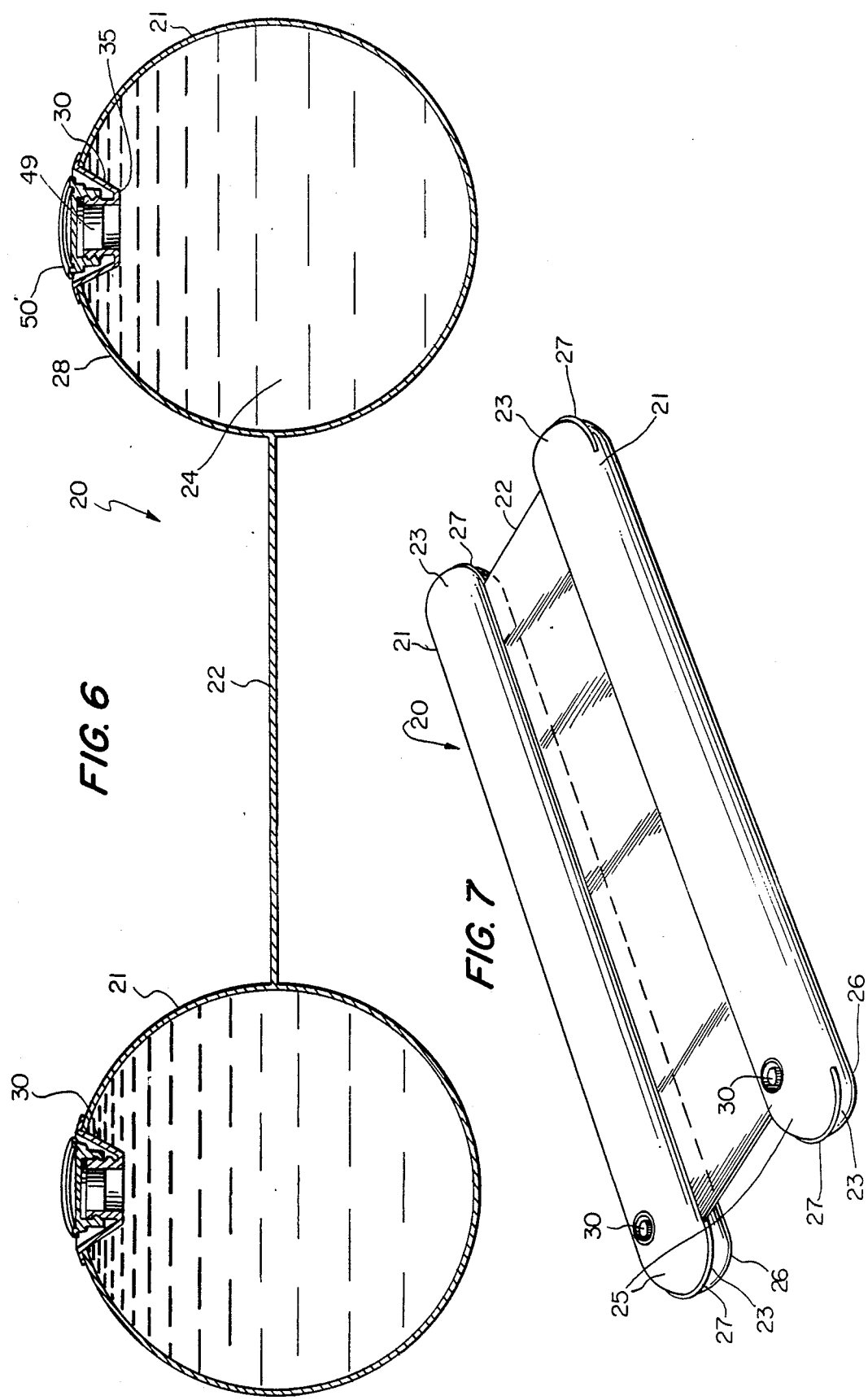

WATER INFLATABLE STRUCTURAL MODULE

BACKGROUND OF THE INVENTION

A. Field of the Invention

The present invention relates to portable structures of the type used to construct temporary barricades. More particularly, the invention relates to a portable inflatable article made of a flexible material which may be inflated with water from a flattened state to form an elongated, modular, double beam-like member useful in constructing dikes for flood control purposes, and similar temporary structures.

B. Field of the Invention

It is sometimes necessary or desirable to rapidly construct a temporary barricade such as a wall, revetment, dike, levee or the like. To satisfy this requirement, bags filled with sand or dirt have long been used to construct dikes or similar structures, to hold back water from a swollen stream or river and thereby preventing damage to agricultural lands or buildings, for example.

Bags used for constructing barricades as described above are referred to as "sand bags," and may be filled with dirt or sand found near the location at which it is desired to construct a wall. Considerable labor and time are required to fill and close the bags. Also, it is sometimes inconvenient to obtain filling material at the construction site. This is particularly true in times of spring floods, when the ground may still be frozen. In this case, fill material must be transported from a remote source to the construction site, along with the bags. While the bags, which are typically made of heavy coarse fabric material such as canvas, are relatively light and easy to transport, the fill material is quite heavy. Therefore, when fill material must be transported to a temporary construction site along with the empty bags to be filled, the logistics required to rapidly construct a revetment wall, dike or other such emergency barrier are substantially complicated.

A variety of articles have been proposed for use in replacing the sand bags traditionally used to rapidly erect barricade revetments for flood control and the like. For example, the following United States patents disclose methods and articles for construction of revetment structures:

Crandall, U.S. Pat. No. 3,374,635, Mar. 26, 1968, *Bags For Use in Revetment Structures*

Lamberton, U.S. Pat. No. 3,425,228, Feb. 4, 1969, *Fabric Forms For Concrete Structures*

Colle, U.S. Pat. No. 3,474,626, Oct. 28, 1969, *Method And Means For Protecting Beaches*

Labora, U.S. Pat. No. 3,886,751, June 3, 1975, *Aquatic Construction Module And Method Of Forming Thereof*

Hepworth, et al., U.S. Pat. No. 3,957,098, May 18, 1976, *Erosion Control Bag* Colle, U.S. Pat. No. 4,184,788, Jan. 22, 1980, *Form For Erosion Control Structures*

Wagner, U.S. Pat. No. 4,362,433, Dec. 7, 1982, *Flood Disaster Control Bag*

Scales, U.S. Pat. No. 4,449,847, May 22, 1984, *Revetment Panel;*

Larsen, U.S. Pat. No. 4,541,751, Sept. 17, 1985, *Method Of Producing And Laying a Barrier Structure.*

The Labora and Wagner patents listed above typify the structural and functional characteristics of prior art devices intended for use as a replacement for the traditional sand bag. Those two patents disclose interlockable, inflatable bags which may be used as forms to construct temporary structures such as flood control revetments. In Labora, a bag-like form has protuberances combined with inlet and outlet port tubes which interlock within indentations in adjacent bags. The modular forms disclosed in Labora are adapted to construction of relatively thin walls having parallel vertical surfaces.

The flood disaster control bag disclosed in Wagner uses a matrix of dimples and bulges on the surface of the form to form a hermaphroditic interlockable surface.

The present invention was conceived of to provide an improved water inflatable structural module of low cost and substantial versatility.

OBJECTS OF THE INVENTION

An object of the present invention is to provide a portable structural module which may be readily transported and assembled on-site, and then used to construct a temporary wall, revetment, flood control dike or the like.

Another object of the invention is to provide a portable structural module made of thin, flexible fabric-like material which may be stored and transported as a light weight unit occupying little volume, and inflated on-site to form a structural module.

Another object of the invention is to provide a portable structural module which may be inflated with water.

Another object of the invention is to provide a portable water-inflatable structural module having a novel shape which facilitates assembling a large number of such modules into an interlocking wall of substantially any thickness, height, or length desired.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferrable from the description contained herein be included within the scope of the invention as defined by the appended claims.

SUMMARY OF THE INVENTION

Briefly stated, the present invention comprehends a portable water inflatable structural module which may be stored and transported in a flattened, deflated state, and inflated on-site to form a structural member. The portable module according to the present invention has a novel shape which permits a plurality of such modules to be readily assembled together to form a temporary wall, revetment, dike or the like for emergency flood control and similar purposes.

The portable water-inflatable structural module according to the present invention comprises an elongated tubular article made of vinyl film or similar water-impervious material. The module according to the present invention includes two parallel, laterally spaced apart, substantially identical cylindrical tubes. Each of the tubes is sealed at both opposite lateral ends to form therewithin a sealed, water-tight chamber. A closable hose fitting connected to each tube permits the tube to be separately inflated with water. A thin, rectangular sheet of vinyl film forms a web joining the inner facing mid-planes of the two cylinders. The lateral spacing between the two inner facing sides of the cylinders, which spacing is determined by the width of the web, is of the proper dimension to permit two cylinders from two adjacent modules, one on either side of a center module, to lie between the cylinders of a first module. Preferably the ratio of lateral spacing to cylinder diameter of the inflated module lies in the approximate range between 1.75 to 1 and 2.0 to 1. Thus constructed, a plurality of such modules can be laid parallel to one another in an interlocking structure of substantial rigidity.

The structural module according to the present invention has a uniform transverse cross-sectional shape. This permits fabriction of the elongated longitudinal portion of a module by a low cost extrusion process, using a single extrusion die to fabricate modules of any desired length.

BRIEF DESCRIPTION OF THE DRAWINGS

FIG. 1 is an upper plan view of a water-inflatable structural module according to the present invention, showing the module in a completely deflated state.

FIG. 2 is a fragmentary, partially sectional, exploded end elevation view showing on an enlarged scale a water inflation attachment preparatory to its installation in a fill port of the module of FIG. 1.

FIG. 3 is a lower perspective view of the attachment of FIG. 2.

FIG. 4 is an upper plan view of the attachment of FIGS. 2 and 3.

FIG. 5 is an end elevation view of the module of FIG. 1, showing one tubular section of the module beginning to be inflated by a water hose.

FIG. 6 is an end elevation view of the module of FIG. 1, showing the module in a fully inflated state.

FIG. 7 is a perspective view of the module of FIG. 1 in a fully inflated state.

FIG. 8 is a diagrammatic end elevation view of several modules of the type shown in FIG. 1, showing the modules stacked into an interlocking, substantially vertically elongated array.

FIG. 9 is a diagrammatic end elevation view of several modules of the type shown in FIG. 1, showing the modules stacked into an interlocking, pyramid-like array.

FIG. 10 is a plan view of several modules of the type shown in FIG. 1, showing the modules stacked into an interlocking, longitudinally elongated array.

DESCRIPTION OF THE PREFERRED Embodiment

Referring now to FIGS. 1 through 7, a water inflatable structural module according to the present invention is shown.

As may be seen best by referring to FIG. 1 and 5, the water inflatable structural module 20 according to the present invention includes two parallel, laterally spaced apart, elongated cylindrical tubes 21 joined by a thin elongated rectangular web 22. Tubes 21 are sealed at opposite lateral ends 23 to form a closed interior space 24 within the tube.

The tubes 21 are made of a flexible, water-impervious fabric such as polyvinylchloride ("PVC" or "vinyl") sheet having a thickness of approximately 0.008 inch to 0.02 inch, the exact thickness depending upon the puncture strength required. Thus, modules forming that portion of a dike which might encounter impacts from floating logs, debris and the like are preferably made of the thicker material, while those in a more benign environment may be thinner. The material of which the tubes 21 are made may be reinforced with imbedded fibers, for those applications requiring greater strength. The web 22 joining the tubes 21 is also made of a flexible material. Preferably, web 22 is also made of vinyl sheeting having a thickness of about 0.008 inch to 0.010 inch.

In one embodiment of the module 20, vinyl tubes 21 are fabricated by an extrusion process. Subsequent to the extrusion process, the ends of the flattened tubes are cut to a generally semicircular shape as shown in FIG. 1. Then the inner facing members of the upper and lower halves 25 and 26 of the ends 23 of each tube are joined together in a seam 27. The joint seam may be formed by welding, such as ultrasonic welding or delectric heating, or by use of a solvent cement or any other convenient means.

As shown in FIGS. 1 and 5, the cylinders 21 are oriented parallel to one another. The inner facing cylindrical walls of the cylinders 21 are joined at their midplanes by the web 22. Web 22 is fastened to the wall 28 of each cylinder 21 by a longitudinally disposed attachment seam 29. Seam 29 can be formed by any convenient means, such as ultrasonic welding.

In a preferred method of constructing module 20 in large quantities, cylindrical tubes 21 and web 22 are simultaneously formed as a single extrusion. The extrusion may then be cut to size and the ends 23 of tubes 21 sealed by any of the methods described above.

As may be seen best by referring to FIGS. 1 through 5, both cylindrical tubes 21 of a module 20 are provided with an inflation port 30 which permits the cylindrical tubes to be individually inflated with water.

As shown in FIG. 2, the inflation port 30 includes a hollow bell-shaped flange 31, the lower annular edge 32 of which is fastened to an annular region 33 of cylindrical tube 21 surrounding a hole 34 provided through the wall 28 of the cylinder. The upper end of bell-shaped flange 31 terminates in an upwardly extending hollow boss 35 which has formed in its outer wall surface 36 helical threads 37. Bell-shaped flange 31 and boss 35 are preferably formed as a single injection molded part from polyethylene or similar plastic material. The lower annular edge 32 of flange 31 may be joined to annular wall 33 surrounding hole 34 by ultrasonic welding, solvent bonding, or any other convenient means.

As shown in FIG. 2, the female coupling from a standard garden hose, or larger diameter hose, could be threaded directly onto boss 35, thereby permitting cylindrical tube 21 to be inflated with water. Preferably, however, an inflation attachment 38 shown in FIGS. 2 through 5 is included with module 20 to facilitate inflation of the tubes 21.

As may be seen best by referring to FIGS. 2 and 3, the inflation attachment 38 consists essentially of an elongated tube 39 rotatably contained within an internally threaded ring 40 which may be screwed onto boss 35. The upper end of the tube 39 has an enlarged diameter boss 41 which has on its inner wall surface 42 internal helical threads 43 adapted to engage the external helical threads of a standard male hose coupling B at the end of a hose A, as shown in FIG. 5.

As may be seen best by referring to FIGS. 2 and 3, the lower end of the inflation attachment tube 39 has a transverse bulkhead 44 containing a central perforation 45 of substantial diameter. The cylindrical wall surface 46 of tube 39 contains a plurality of longitudinally disposed slots 47 spaced apart at regular circumferential distances. The slots 47 are of substantial length and width, and alternate with longitudinally disposed ribs 48.

The purpose of inflation attachment 38 is to minimize the back pressure provided to the inflating water source when the cylinders 21 are in a flattened, deflated state. Thus, with a cylinder 21 deflated as shown in FIG. 2, water admitted into the interior space 24 of the cylinder without using inflation attachment 38 would be presented a substantial flow resistance by the closely spaced, flattened lower half 26 of cylindrical wall 28 of cylinder 21. However, with tube 39 of inflation attachment 38 installed as shown in FIG. 5, water may flow transversely into cylinder 21 with far less resistance, allowing the cylinder 21 to be inflated more rapidly than would be possible without use of the attachment.

Preferably, the inner wall surface of ring 40 on inflation attachment tube 39 contains a plurality of longitudinally disposed channels 51, spaced apart at regular circumferential angles. Channels 51 function as vents, allowing any air in cylinders 21 to escape as water fills the cylinders. Re-sealable vents could be also provided through the wall of cylinder 25 at other locations, if desired After a cylinder 21 has been inflated, inflation attachment 38 may be unscrewed from fill boss 35. The inflation port 30 may then be sealed by inserting a flanged cup-shaped plug 49 into boss 35, and then screwing internally threaded cap 50 onto the boss. Then the boss 35 and cap 50 may be pushed downwards into the interior 24 of cylinder 21 to become flush with the outer cylindrical wall surface 28 of the cylinder, owing to the flexibility of lower annular flange section 32 of flange 31, and the flexibility of the vinyl material in the annular flange region 33 surrounding hole 34. FIGS. 6 and 7 illustrate the appearance of a module 20 with both cylinders inflated, in transverse sectional and upper perspective views, respectively. So inflated, the module 20 constitutes a structural member of substantial strength and weight which may be used to construct temporary dams, dikes and the like.

A particularly advantageous feature of the water inflatable structural module 20 according to the present invention is the novel design which permits any number of such modules to be rapidly laid atop one another to form an interlocked structure of substantial rigidity, and of any desired size without the use of any fastening elements. To achieve the desired interlockability, the ratio of the lateral span distance between the two cylinders 21 of a module 20, i.e., the width of web 22, to the inflated diameter of cylinders 21 is chosen to be in the range of approximately 1.75 to 1, to 2 to 1. It should be noted that the width of a deflated cylinder is $\pi/2$ as large as its inflated width, so the corresponding web-width to cylinder-width rated in the deflated state would be in the approximate range of 1.114 to 1, to 1.273 to 1. With the above indicated ratio of web-width to cylinder diameter, a number of modules 20 may be stacked to form a securely interlocking, substantially vertically oriented wall, as shown in FIG. 8. Also, the aforementioned ratio between web width and cylinder diameter permits stacking a substantial number of modules 20 into a securely interlocking, generally pyramidal shape, as shown in FIG. 9.

As shown in FIG. 8, modules 20 may be used to assemble structures of any desired height, while FIG. 9 shows the method of stacking the modules into structures having any desired thickness. FIG. 10 illustrates the manner in which modules 20 may be interlockably stacked to form structures of any desire length.

The stacking methods depicted in FIGS. 8, 9 and 10 can of course be combined to form different interlocking shapes. Thus, the novel water inflatable module according to the present invention provides a highly effective means for constructing rigid barricades of a wide variety of shapes.

Since the weight of the modules 20 when empty is negligible compared to their weight when filled with water, the filled modules have a substantially neutral buoyancy, i.e., an effective specific gravity very close to that of water. Accordingly, the height of structures constructed with modules 20 must exceed the depth of water to be dammed, typically by a factor of one-third, to provide adequate vertical and interlocking force to keep the structure in place in spite of the buoying force of the water contained.

As mentioned above, the ratio of web width to inflated cylinder width for modules 20 should lie in the range of approximately 1.75 to 1, to 2 to 1. The exact dimensions of the module 20, including its length, are of course, a matter of design choice. One example embodiment of module 20 which was tested had the following approximate dimensions.

Length: 89½ inches
Web width: 17½ inches
Deflated cylinder width: 14¾ inches
Deflated overall width: 47 inches
Inflated cylinder diameter: 9½ inches
Inflated overall width: 36½ inches

What is claimed is:

1. A structural module having a longitudinal portion and first and second opposite lateral ends, said longitudinal portion of said module, being of elongated and substantially uniform transverse cross-sectional shape permitting fabrication of said longitudinal portion of said module solely by an extrusion process, said module being inflatable with liquid and comprising (a) a first elongated sealed tube formed of a substantially water impervious material, said tube having parallel, longitudinally disposed edges and sealed opposite lateral ends forming therewithin a sealed water—tight chamber, and said tube having, through a wall surface thereof, a closeable opening permitting water under pressure to be introduced into said chamber, thereby inflating said tube from a flattened, generally rectangular shape into a generally cylindrical shape capable of resting on a surface without the use of any auxiliary support means, (b) a second tube substantially identical in shape to said first tube oriented parallel to said first tube, and (c) a thin web having a substantially rectangular planview shape and parallel elongated longitudinal edges, said web being joined at a first one of said longitudinal edges to a first, inner one of said longitudinal edges of said first tube and said web being joined at a second one of said longitudinal edges to a first inner one of said longitudinal edges of said second tube, said web having a width at least as large as the inflated diameter of both first and second tubes, thereby permitting an inflated tube of a second such module to lie in parallel alignment with tubes of a first module on said web of said first module to form a laterally interlocking structure, without the use of any fastening elements.

2. The module of claim 1 wherein said web is made of thin, flexible material.

3. The module of claim 1 wherein the ratio of web width and minimum spacing between said first and second tubes to the diameter of said first or second tubes when both of said tubes are inflated lies in the approximate range of 1.75 to 1 to 2 to 1, thereby permitting a tube of a second module and a tube of third module to lie between said first and second tubes of a first module, thereby forming a laterally interlocking structure.

4. The module of claim 3 wherein said thin, water impervious material of which said first and second tubes are made is further defined as being a plastic film.

5. The module of claim 4 wherein said plastic film is further defined as being vinyl.

6. The module of claim 3 wherein said web is made of plastic film.

7. The module of claim 6 wherein said plastic film is further defined as being vinyl.

8. The module of claim 1 further including means for venting air from each of said chambers of said tubes during the time said tube is being inflated with water.

9. The module of claim 8 wherein said means for venting air comprises in combination with said module a fitting attachable to said opening in said tube of said module having a longitudinally disposed air exit channel.

10. A structural module of having a longitudinal portion and first and second opposite lateral ends, said longitudinal portion of said module being elongated and substantially uniform transverse cross-sectional shape permitting fabrication of said longitudinal portion of said module solely by an extrusion process, said module being inflatable with liquid and comprising (a) a first elongated tube formed of flexible, water impervious plastic film, said tube having in a flattened, deflated state an elongated rectangular planview shape, said tube being sealed at opposite lateral ends to form within said tube a sealed, watertight chamber, said tube having at least one sealable inlet port communicating with said water-tight chamber, whereby water under pressure may be introduced into said chamber, and said port then sealed to form an elongated generally cylindrically shaped tube, capable of resting on a surface without the use of any auxiliary support means, (b) a second tube substantially identical in shape to said first tube oriented parallel to said first tube, and (c) a thin web of plastic film having in plan-view an elongated, substantially rectangular shape and parallel, longitudinally disposed edges, said web being joined at a first one of said longitudinal edges to the outer cylindrical wall surface of said first tube along a longitudinal mid-plane of said first inflated cylindrical tube, and said tube being joined at a second one of said longitudinal edges to the outer cylindrical wall surface of said second tube along a longitudinal mid-plane of said second inflated cylindrical tube, said web having a width at least as large as the inflated diameter of both of said first and second tubes, thereby permitting an inflated tube of a second such module to lie in parallel alignment with tubes of a first module on said web of said first module to form a laterally interlocking structure, without the use of any fastening elements.

11. The module of claim 2 wherein said thin web is made of a flexible material.

12. The module of claim 11 wherein said flexible material is a thin plastic film.

13. The module of claim 12 wherein said first and second tubes are formed as a unitary extrusion.

14. The module of claim 12 wherein said opposite lateral ends of each of said first and second tubes are sealed by bonding, along a laterally disposed seam line, the upper and lower walls of said deflated tubes.

15. The module of claim 2 wherein the ratio of web width and minimum perpendicular spacing between said first and second tubes, to the diameter of said first or second tubes when both of said tubes are inflated, with said tubes lying in a horizontal plane and said web being flat and parallel to said horizontal plane, lies in the approximate range of 1.75 to 1 to 2 to 1, thereby permitting a tube of a second module and a tube of a third module to lie between said first and second tubes of a first module with all four of said tubes in parallel alignment, and substantially tangential contact, thereby forming a structure which resists movement in a horizontal plane perpendicular to the longitudinal axes of said tubes.

16. The module of claim 12 wherein said plastic film contains imbedded fibers adapted to increase the tensile strength and puncture resistance of said tubes.

17. The module of claim 2 wherein said sealable inlet port comprises a circularly symmetric tubular fitting bonded at a lower annular wall surface to an annular zone surrounding an entrance hole provided through the wall of said tube, the upper end of said fitting being adapted to receive a water-conveying tube, and said fitting being adapted to seal its upper entrance opening after said tube has been inflated with water.

18. The module of claim 17 wherein at least a lower portion of the wall of said fitting proximate said annular bond with said annular zone of said wall of said tube is made of a material sufficiently flexible to permit pushing said fitting down into said chamber of said tube sufficiently far for it to be substantially flush with the outer cylindrical wall surface of said tube, after said tube has been inflated with water and the upper entrance opening of said fitting sealed.

* * * * *